United States Patent Office 3,642,678
Patented Feb. 15, 1972

3,642,678
OLEFIN POLYMER/WAX COATING COMPOSITION
Thomas H. Shepherd, Hopewell, and Murray H. Reich, Princeton, N.J., assignors to Princeton Chemical Research, Inc., Princeton, N.J.
No Drawing. Continuation-in-part of application Ser. No. 671,568, Sept. 29, 1967. This application Aug. 19, 1969, Ser. No. 851,492
Int. Cl. C08c *11/70;* C08f *15/40, 45/52*
U.S. Cl. 260—28.5    9 Claims

ABSTRACT OF THE DISCLOSURE

Olefin polymer/wax blends as coating compositions for paperboard or other paper stock materials. The olefin polymer, which comprises from 5% to 50% by weight of the blend, is a terpolymer of butene-1 with propylene and an alpha-olefin having a chain length of from 5 to 20 carbon atoms.

CROSS REFERENCE TO OTHER APPLICATIONS

This application is a continuation-in-part of copending application Ser. No. 671,568, filed Sept. 29, 1967 and now abandoned.

The olefin polymer/wax blends hereof may incorporate any of the waxes described, for example, in copending applications Ser. No. 430,158 filed on Feb. 3, 1965 (PCR–51) now abandoned and Ser. No. 664,963 filed on Sept. 1, 1967 (PCR–358–M–5494). The blends of the present invention may further be admixed, if desired, with the chlorinated butene-1 polymers described in the last mentioned application.

The disclosures of the above noted applications, each of which is owned by the assignee of the present invention, are incorporated herein by reference.

BACKGROUND OF THE INVENTION (1) Field of the invention

This invention relates to a composition for coating various substrates to impart improved properties thereto. More specifically, it relates to a composition for coating paperboard or other paper stock materials to improve, inter alia, their water vapor transmission resistance, coating adhesion, tensile strength, flexibility and gloss characteristics.

(2) Prior art

Various coatings have heretofore been utilized in an effort to increase the tensile strength, flexibility and gloss characteristics of paper stock substrates, and to improve the creased barrier properties of such coated materials. Thus, ethylene-vinyl acetate copolymer compositions (e.g., those marketed as ELVAX 150, ELVAX 250, and ELVAX 420) are currently available as commercial additives for upgrading waxes employed, for example, in the coating of paper and paperboard used for the manufacture of food wrappers and paper cartons. More recently, it has been proposed, in U.S. Pats. Nos. 3,326,834 and 3,326,835, granted on June 20, 1967, to add polybutene-1 resins to petroleum waxes to impart improved creased barrier properties to paper stocks coated therewith, as compared with similar substrates coated with wax compositions incorporating, for example, the above noted ethylene/vinyl acetate copolymer additives.

It has also been disclosed that butene-1/propylene copolymers can be used as a hydrocarbon wax for paper coatings (ref. French Pat. No. 1,418,111; Chem. Abst. 65, 5690c, 1966).

It has been found that paper stocks treated with wax blends incorporating materials such as those described above are not entirely satisfactory for commercial purposes. Coatings contained various wax/polybutene-1 resin blends, for example, impart lower tensile strength to the coated stocks than possessed by the uncoated materials per se.

It has now been found possible, in accordance with the present invention, to obviate the deficiencies of previously known wax-containing coatings for paper stock materials, and to provide novel coatings which impart improved tensile strength and barrier properties to the coated stock material while simultaneously increasing the adhesive, flexibility and gloss characteristics thereof.

Other objects and advantages of this invention will be apparent from a consideration of the following detailed description, including specific illustrations of preferred embodiments thereof.

SUMMARY OF THE INVENTION

Accordingly, it has been found possible to markedly improve a number of physical and chemical properties of paper stock material substrates by coating the same with an olefin polymer/wax blend composition, the olefin polymer constituent of which is a member of a specific class of terpolymers. Such materials comprise terpolymers of butene-1, propylene and alpha-olefins having chain lengths of from 5 to 20 carbon atoms.

The olefin polymer/wax blend hereof may be applied to any paper stock packaging materials, including kraft paper, glassine paper, pouch paper, parchment paper, milk paperboard, cardboard and chipboard. It is intended that all such materials are embraced within the term "paper stock materials," as used herein.

PREFERRED EMBODIMENTS OF THE INVENTION

In the following detailed discussion of preferred embodiments of the invention, all parts and percentages are given by weight and all temperatures are specified in ° C., unless otherwise indicated.

The terpolymers incorporated in the wax blends hereof may be made by any desired conventional polymerization technique, the parameters of which are such as to produce polymers having crystalline contents or isotacticities (as determined by their insoluble fractions in diethyl ether) of as low as 5% to as much as 90%, preferably from 30% to 90%. For such purpose, use may be made of Ziegler catalyst systems incorporating Group IV metal salts and appropriate organo-metallic co-catalysts. Alternatively, other catalyst systems useful in the interpolymerization of olefinically unsaturated monomers may be similarly employed. Polymerization techniques and catalysts so useful are illustrated, for example, in the aforesaid U.S. Pats. Nos. 3,326,834 and 3,326,835.

As noted above, terpolymers of butene-1, propylene, and $C_5$–$C_{20}$ alpha-olefins, preferably those alpha-olefins having from 8 to 18 carbon atoms, are employed in the wax blends of the invention. The terpolymers will normally contain at least 2 weight percent of $C_5$-$C_{10}$ alpha-olefin. Desirably, the terpolymers will contain at least 50 weight percent of butene-1, at least 2 weight percent of propylene, and at least 2 weight percent of the alpha-olefin. Preferably, the terpolymer is a terpolymer of 50 to 95 weight percent butene-1, 2 to 48 weight percent propylene, and 2 to 32 weight percent alpha-olefin, and more preferably from 50 to 90 weight percent butene-1, 48 to 5 weight percent propylene, and 2 to 32 weight percent alpha-olefin. In certain aspects of the invention it is desirable for the proportion of the monomers to be 50 to 80 weight percent butene-1, 48 to 18 weight percent propylene, and 2 to 32 weight percent alpha-olefin.

The designated olefin terpolymers may be blended with any of a large variety of waxes for the purposes of the present invention. Petroleum waxes having melting points in the range of from about 120° to 190° F., and including paraffin waxes, microcrystalline waxes, and intermediate waxes constituting blends or mixtures of paraffin and microcrystalline waxes, may be so employed. Alternatively, the terpolymers may be blended with other waxes including candelilla, carnauba, spermaceti or montan wax, to provide suitable coating compositions. Suitably, the terpolymer is blended with the wax carrier in an amount of from about 5% to 50%, preferably from about 10% to 40%, by weight of the resulting blend.

Other modifying constituents, in amounts of up to 30% by weight, may additionally be incorporated in the olefin polymer/wax blend. Conventional modifiers which may be so blended include the following: terpene, coumarone, styrene-modified coumarone/indene, phenol-formaldehyde, chlorinated aromatics, rosin and rosin ester resins.

The resulting polymer/wax blends may be coated on desired paper stock materials from hot melts employing conventional coating techniques, e.g., by means of a doctor knife or wire wound rod. Upon cooling, coatings thus formed adhere strongly to the paper substrates.

The paper stock coatings thus formed have been found to impart superior creased barrier properties to the coated substrates, i.e., to minimize the passage of water vapor through the paper or paperboard stock material when creased or folded. Paper stocks thus coated possess decreased water vapor transmission rates (WVTR) as compared, for example, with resin/wax blends incorporating either polyethylene or polybutene-1 resins, per se. Moreover, and as indicated in the examples set forth hereinafter, it has been found that coatings comprising blends of the specified olefin terpolymers and waxes exhibit improved adhesion to the substrate treated, increased tensile strength, and superior flexibility and gloss characteristics as compared with previously recommended wax/resin blends.

The following examples (in which parts are by weight unless otherwise indicated) illustrate preferred embodiments of the composition of the present invention without, however, being intended as limiting thereof:

EXAMPLE 1

Preparation of 90/5/5 butene-1/propylene/decene-1 terpolymer

A one-gallon autoclave was first flushed with dry nitrogen and then charged with:

$TiCl_3$-1/3$AlCl_3$—3.0 gram
$(C_2H_5)_2AlCl$—33 milliliters
Cyclohexane—1.5 liters The reactor was then closed, agitation was started, and the contents were heated to 60° C. The following monomers were then charged:

| | Grams |
|---|---|
| Butene-1 | 405 |
| Propylene | 22.5 |
| Decene-1 | 22.5 |

(414 grams of the monomer mixture was charged.)

The reaction mixture was then agitated for 1 hour and 55 minutes at 60°–69.5° C., during which period the pressure fell from 58 p.s.i.g. to 25 p.s.i.g. The reactor was then cooled, vented, and 321 grams of polymer was recovered.

EXAMPLE 2

By a procedure analogous to that described in Example 1, 327 grams of a 90/5/5 butene-1/propylene/decene-1 terpolymer was prepared from 416 grams of monomer mixture. The catalyst consisted of 35 milliliters of diethylaluminum chloride and 4.0 grams of a mixture of titanium trichloride and aluminum chloride, said mixture containing 3 moles of $TiC_3$ per mole of $AlCl_3$. The reaction temperature varied from 85° C. to 88° C.

EXAMPLES 3

By procedures analogous to those described in Example 1, different butene-1/propylene/alpha-olefin polymers were prepared at polymerization temperatures that varied from 61° to 85° C. The polymers were blended with paraffinic wax to give blends of 10 percent and 25 percent polymer. The polymer-wax blends were applied to pouch paper by a wire wound rod. The coated papers were heat sealed and the heat seal strengths were measured. The tables below display the bond strengths that were found for the heat sealed papers, the alpha-olefins used, the proportions of the monomers, and the polymerization temperatures used in preparing the terpolymers.

TABLE I.—BOND STRENGTHS OF HEAT SEALED PAPER USING WAX BLEND CONTAINING 10 WEIGHT PERCENT TERPOLYMER

| Alpha-olefin | Bu/Pro/ olefin ratios | Polymerization temp., °C. | Bond strength, grams/inch | |
|---|---|---|---|---|
| | | | Average[1] | Max. |
| Decene-1 | [2] 90/5/5 | 61 | 20 | 25 |
| Hexadecene-1 | 90/5/5 | 60 | 35 | 41 |
| Decene-1 | [3] 85/5/10 | 72 | 48 | 52 |
| Do | 85/5/10 | 83 | 63 | 76 |
| Hexadecene-1 | 90/5/5 | 85 | 113 | 140 |

[1] Average of 2 or 3 samples.
[2] Polymerization reaction included 0.024 gram mole of hydrogen per 100 grams of monomer as a molecular weight regulator.
[3] Polymerization reaction included 0.006 gram mole of hydrogen per 100 grams of monomer.

TABLE II.—BOND STRENGTHS OF HEAT SEALED PAPER USING WAX BLEND CONTAINING 25 WEIGHT PERCENT TERPOLYMER

| Alpha-olefin | Bu/Pro/ olefin ratios | Polymerization temp., °C. | Bond strength, grams/inch | |
|---|---|---|---|---|
| | | | Average[1] | Max. |
| Decene-1 | [2] 90/5/5 | 61 | 104 | 160 |
| Hexadecene-1 | 90/5/5 | 60 | 125 | 134 |
| Decene-1 | [3] 90/5/5 | 72 | 132 | 195 |
| Do | [3] 85/5/10 | 72 | 123 | 150 |
| Do | 85/5/10 | 83 | 147 | 195 |
| Hexadecene-1 | 90/5/5 | 85 | 247 | 355 |

[1] Average of 2 or 3 samples.
[2] 0.024 gram mole of hydrogen per 100 grams of monomer in polymerization reaction.
[3] 0.006 gram mole of hydrogen per 100 grams of monomer in polymerization reaction.

As the foregoing tables illustrate, the terolymers prepared at higher temperatures (e.g., at 80° to 90° C.) yield higher bond strengths on coated paper than the terpolymers prepared at lower temperatures.

EXAMPLE 4

About five pounds of the 90/5/5 butene/propylene/hexadecene-1 terpolymer was made at 85° C. and the polymer was mixed with paraffinic wax to give 50 pounds of a 10% polymer blend. The blend was applied to pouch paper using pilot plant paper coating equipment, e.g., die coater and a gravure coater. The polymer-wax blend was successfully applied to pouch paper on the pilot plant scale. The coating had excellent adhesion to pouch paper and higher heat seal bond strength than did the paper coated in the laboratory scale equipment. The bond strength of the pilot plant scale coated paper was 141 grams/inch (average of 5 samples).

EXAMPLE 5

A terpolymer of butene-1 with propylene and dodecene-1 was prepared from the corresponding monomers in the proportion 80/10/10 parts of the respectively materials, the polymerization being so effected as to provide a product having a 55% crystalline content. The terpolymer thus formed was blended with paraffin wax by the following procedure:

80 grams of a fully refined paraffin wax (138/140 AMP, having a distilling temperature of 750–810° F.) was heated at 140° C. in a 400 milliliter beaker. To this melt, 20 grams of the terpolymer was slowly added. The melt was stirred to homogeneity, as shown by its clarity.

The clear, hot blend was applied to milk paperboard by doctoring. The coating had good adhesion to the paperboard, no peeling, cracking or flaking occurring upon creasing the substrate 180°. Moreover, the coating imparted a higher gloss, increased hardness and abrasion resistance, faster melt-setting characteristics, and improved vapor barrier properties, as compared with similar wax blends with, for example, polyethylene or polypropylene resins. The blend further possessed an advantageous low melt viscosity which permitted the use of lower application temperatures and consequent formation of coated paperboard having increased tensile strength. The tensile strength of the thus coated board was increased to 70 p.s.i. (from a 59 p.s.i. value for the untreated substrate).

EXAMPLE 6

Comparison of terpolymer with butene-1/propylene copolymer

The paper coating properties of wax blends containing the terpolymer of Example 1 were compared with similar wax blends containing a butene-1/propylene copolymer.[1]

The wax/polymer blends were made from Mobil Wax 138/140 as follows:

TABLE III.—COMPOSITION OF WAX BLENDS

| Sample No. | Polymer | Parts by weight Polymer | Parts by weight Wax | Percent of polymer |
|---|---|---|---|---|
| A | Terpolymer | 10 | 90 | 10 |
| B | do | 30 | 90 | 25 |
| C | do | 50 | 90 | 35.7 |
| D[1] | do | 20 | 80 | 19 |
| E[1] | do | 30 | 70 | 28.5 |
| F | Copolymer | 10 | 90 | 10 |
| G | do | 30 | 90 | 25 |
| H | do | 50 | 90 | 35.7 |
| I[1] | do | 20 | 80 | 19 |
| J[1] | do | 30 | 70 | 28.5 |

[1] These blends also contained 5 parts by weight of Piccotex 100 tackifier.

The several blends were applied to pouch paper by a wire wound rod. During the application, the paper was supported on glass that was heated to 80° C. The table below displays the blend temperatures and the ratings of the coated papers.

[1] The copolymer was a 69/31 butene-1/propylene block copolymer prepared by first polymerizing 126 grams of butene-1 for 50 minutes at 60° C. (catalyst-33 ml. of diethylaluminum chloride and 3.0 grams of TiCl₃), and then adding 255 grams of a 54/46 butene-1/propylene mixture and continuing the polymerization for about 100 minutes. The yield was 353 grams of copolymer.

TABLE IV. COMPARISON OF COPOLYMER AND TERPOLYMER BLENDS

| Sample | Blend temp., ° C. | Gloss of paper | Adhesion of coating to paper | Coating gage, inches | Color of coating |
|---|---|---|---|---|---|
| A | 150 | Fair | Poor | 0.053 | Clear. |
| A | 100 | Good | do | 0.025 | Do. |
| A | 80 | Fair | do | 0.036 | Do. |
| B | 150 | Good | Good | 0.018 | Do. |
| B | 100 | Excellent | Excellent | 0.028 | Do. |
| C | 150 | do | do | 0.043 | Do. |
| C | 100 | Fair | Fair | 0.043 | Do. |
| D | 150 | do | do | 0.038 | Do. |
| D | 100 | do | Good | 0.025 | Do. |
| E | 150 | Good | Excellent | 0.020 | Do. |
| E | 100 | do | do | 0.024 | Do. |
| F | 150 | Poor | Poor | 0.004 | Do. |
| F | 100 | do | do | 0.004 | Do. |
| G | 150 | do | do | 0.011 | Do. |
| G | 100 | Good | do | 0.016 | Do. |
| H | 150 | Excellent | Excellent | 0.026 | Do. |
| H | 100 | Good | do | 0.047 | Do. |
| I | 150 | Poor | Poor | 0.030 | Amber. |
| I | 100 | do | do | 0.030 | Do. |
| J | 150 | do | do | 0.037 | Clear. |
| J | 100 | Fair | do | 0.048 | Do. |

Wax blends using the subject terpolymers yield better coatings on paper over a wider range of proportions, etc., than the blends containing the copolymer.

What is claimed is:

1. An improved olefin polymer/wax blend coating composition containing from about 5 to about 50 percent by weight of said olefin polymer, wherein said olefin polymer is a terpolymer of butene-1, propylene, and at least 2 weight percent of an alpha-olefin of from 10 to 16 carbon atoms, and wherein the wax is at least one member of the group consisting of petroleum wax having a melting point of from about 120°–190° F., candelilla wax, carnauba wax, spermaceti wax and montan wax.

2. The composition of claim 1 wherein said terpolymer is a terpolymer of at least 50 weight percent butene-1, at least 3 weight percent propylene, and at least 2 weight percent of an alpha-olefin of 10 to 16 carbon atoms.

3. The composition of claim 1 wherein said terpolymer is a terpolymer of from 50 to 95 weight percent of butene-1, from 2 to 48 weight percent of propylene, and from 2 to 32 weight percent of alpha-olefin.

4. The composition of claim 1 wherein said terpolymer is a terpolymer of butene-1, propylene, and decene-1.

5. The composition of claim 4 wherein said terpolymer is a terpolymer of about 90 weight percent butene-1, about 5 weight percent propylene, and about 5 weight percent decene-1.

6. The composition of claim 1 wherein said terpolymer is a terpolymer of butene-1, propylene, and hexa-decene-1.

7. The composition of claim 6 wherein said terpolymer is a terpolymer of about 90 weight percent butene-1, about 5 weight percent propylene, and about 5 weight percent hexadecene-1.

8. The composition of claim 1 wherein said terpolymer is a terpolymer of 50 to 90 weight percent butene-1, 48 to 5 weight percent propylene, and 2 to 32 weight percent alpha-olefin.

9. The composition of cliam 3 wherein the wax is paraffin wax and wherein the terpolymer is from about 10–40 weight percent of the terpolymer/wax blend.

References Cited

UNITED STATES PATENTS 3,326,834 6/1967 Signorelli et al. -- 260—28.5 A
3,326,835 6/1967 Signorelli et al. -- 260—28.5 A
3,338,885 8/1967 Kray _____ 260—28.5 A

FOREIGN PATENTS 1,418,111 10/1965 France.

MORRIS LIEBMAN, Primary Examiner

S. L. FOX, Assistant Examiner

U.S. Cl. X.R.

117—161; 260—80.78